(12) United States Patent
Patel et al.

(10) Patent No.: US 11,416,509 B2
(45) Date of Patent: Aug. 16, 2022

(54) DATA PROCESSING SYSTEMS AND METHODS FOR EFFICIENTLY TRANSFORMING ENTITY DESCRIPTORS IN TEXTUAL DATA

(71) Applicant: EQUIFAX INC., Atlanta, GA (US)

(72) Inventors: Piyushkumar Patel, Peachtree City, GA (US); Rajkumar Bondugula, Marietta, GA (US)

(73) Assignee: EQUIFAX INC., Atlanta, GA (US)

( * ) Notice: Subject to any disclaimer, the term of this patent is extended or adjusted under 35 U.S.C. 154(b) by 320 days.

(21) Appl. No.: 16/347,543

(22) PCT Filed: Nov. 6, 2017

(86) PCT No.: PCT/US2017/060124
§ 371 (c)(1),
(2) Date: May 3, 2019

(87) PCT Pub. No.: WO2018/085757
PCT Pub. Date: May 11, 2018

(65) Prior Publication Data
US 2020/0265059 A1 Aug. 20, 2020

Related U.S. Application Data

(60) Provisional application No. 62/418,543, filed on Nov. 7, 2016.

(51) Int. Cl.
*G06F 16/25* (2019.01)
*G06F 40/205* (2020.01)
(Continued)

(52) U.S. Cl.
CPC .......... *G06F 16/254* (2019.01); *G06F 16/258* (2019.01); *G06F 40/205* (2020.01); *G06F 40/295* (2020.01); *G06Q 10/10* (2013.01)

(58) Field of Classification Search
CPC .......................... G06F 16/254; G06F 16/258
See application file for complete search history.

(56) References Cited

U.S. PATENT DOCUMENTS 7,870,117 B1 1/2011 Rennison
10,102,298 B2 * 10/2018 Madisch ............... G06F 16/245
(Continued)

FOREIGN PATENT DOCUMENTS

WO 0212982 2/2002
WO 2018085757 5/2018

OTHER PUBLICATIONS

PCT/US2017/060124, "PCT Search Report", dated Mar. 7, 2018, 11 pages.

*Primary Examiner* — Son T Hoang
(74) *Attorney, Agent, or Firm* — Kilpatrick Townsend & Stockton LLP

(57) ABSTRACT

In some aspects, a computing system can receive, from a client device, a request to perform an analytical operation that involves a query regarding a common entity type. The computing system can extract a query parameter having a particular standardized entity descriptor for the common entity type and parse a transformed dataset that is indexed in accordance with standardized entity descriptors. The computing system can match the particular standardized entity descriptor from the query to records from the transformed dataset having index values with the particular standardized entity descriptor. The computing system can retrieve the subset of the transformed dataset having the index values with the particular standardized entity descriptor. In some aspects, the computing system can generate the transformed dataset by performing conversion operations that transform records in a data structure by converting a set of different entity descriptors into a standardized entity descriptor for the common entity type.

20 Claims, 4 Drawing Sheets

(51) Int. Cl.
  *G06F 40/295*  (2020.01)
  *G06Q 10/10*  (2012.01)

(56) References Cited

U.S. PATENT DOCUMENTS

| | | | |
|---|---|---|---|
| 2005/0288920 A1* | 12/2005 | Green | G06F 40/30 |
| | | | 704/3 |
| 2006/0288268 A1 | 12/2006 | Srinivasan et al. | |
| 2007/0294200 A1 | 12/2007 | Au | |
| 2010/0286979 A1* | 11/2010 | Zangvil | G06F 40/40 |
| | | | 704/9 |
| 2011/0302167 A1* | 12/2011 | Vailaya | G06F 16/2458 |
| | | | 707/E17.089 |
| 2013/0144874 A1* | 6/2013 | Koperda | G06F 16/24578 |
| | | | 707/730 |
| 2014/0236579 A1 | 8/2014 | Kurz | |
| 2015/0370799 A1* | 12/2015 | Kushmerick | G06F 16/285 |
| | | | 707/740 |
| 2016/0232160 A1* | 8/2016 | Buhrmann | G06F 16/367 |

\* cited by examiner

DATA PROCESSING SYSTEMS AND METHODS FOR EFFICIENTLY TRANSFORMING ENTITY DESCRIPTORS IN TEXTUAL DATA

CROSS REFERENCE TO RELATED APPLICATIONS

This disclosure claims the benefit of priority of U.S. Provisional Application No. 62/418,543, titled "Data Processing Systems and Methods for Efficiently Transforming Entity Descriptors in Textual Data" and filed on Nov. 7, 2016, which is hereby incorporated in its entirety by this reference.

TECHNICAL FIELD

This disclosure generally relates to computer-implemented systems and methods for improving query performance and other data-processing efficiencies by transforming data for processing, and more particularly relates to efficiently transforming entity descriptors in textual data.

BACKGROUND

Certain data processing systems are used for processing human-perceptible elements of electronic information, such as textual content. For example, one or more servers that implement data processing systems can communicate with client systems (e.g., end user devices, databases, etc.) to gather textual data. These data processing systems can format, edit, prepare, or otherwise process text data for further use (e.g., analysis or display). This processing may present challenges when large amounts of data are obtained for comparison and processing from different, independent data systems (e.g., independent data providers using different schemes for describing the same characteristics of certain entities).

SUMMARY

Certain aspects of this disclosure describe systems and methods for using transformed entity descriptors that are included in textual data. For example, a computing system can receive, from a client device, a request to perform an analytical operation that involves a query regarding a common entity type. The computing system can extract a query parameter having a particular standardized entity descriptor for the common entity type and parse a transformed dataset that is indexed in accordance with standardized entity descriptors. The computing system can match the particular standardized entity descriptor from the query to a subset of the transformed dataset having index values with the particular standardized entity descriptor. The computing system can retrieve the subset of the transformed dataset having the index values with the particular standardized entity descriptor. In some aspects, the computing system can generate the transformed dataset by performing conversion operations that transform records in a data structure by converting a set of different entity descriptors into a standardized entity descriptor for the common entity type.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
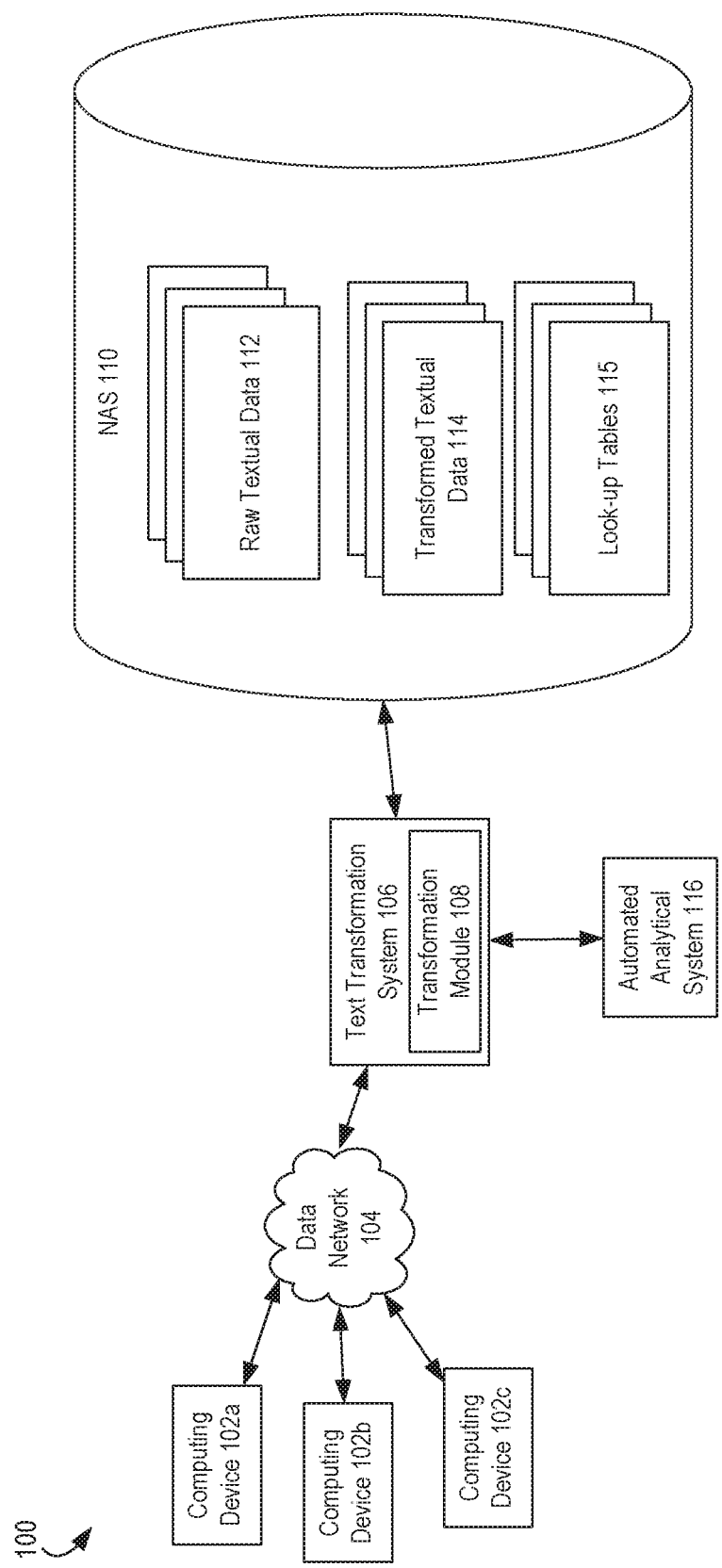
FIG. 1 depicts an example of a computing environment having a text transformation system that is usable for efficiently transforming entity descriptors in textual data, according to some aspects of the present disclosure.

Certain aspects of this disclosure describe systems and methods for efficiently transforming entity descriptors that are included in textual data. For example, a text transformation system can receive or access a set of records describing various entities, where each entity is associated with a certain descriptor (e.g., a name, a title, etc.). The text transformation system can apply a set of transformation operations to the entity descriptors. This set of transformation operations can standardize the descriptors so that different variants of a given entity descriptor (e.g., "STORE MANAGER," "STORE MGR." "STR MGR") are converted into the same descriptor (e.g., "STORE MANAGER"). The performance of these operations can generate standardized entity descriptors for use in subsequent analytical operations. In some aspects, these transformation operations can also be performed in an order that optimizes one or more standardization metrics (e.g., number of transformation operations, percentage of the transformed title that matches a standardized title known to the system, etc.).

For example, an analytical system or other online computing system can service queries for transformed datasets indexed in accordance with standardized entity descriptors more efficiently than would be feasible for datasets involving non-standardized entity descriptors. The analytical system receives a request from a client device to perform an analytical operation, wherein the analytical operation involves one or more queries a certain type of entity (e.g., certain roles in an organization). The analytical system services the query by extracting a query parameter having a particular standardized entity descriptor for the entity type (e.g., a job title). The analytical system parses a transformed dataset that is indexed in accordance with standardized entity descriptors, matches the particular standardized entity descriptor extracted from the query to a subset of the transformed dataset having index values with the particular standardized entity descriptor, and services the query by retrieving this subset of the transformed dataset. Because the transformed dataset has been generated using various transformation operations described herein, which can allow the dataset to be indexed by a standardized entity descriptor, these queries can be serviced with the same performance level (i.e., returning the relevant results) while decreasing processing resources, network bandwidth, or other computing resources that may be required for servicing multiple queries directed to non-standardized entity descriptors.

Certain aspects involve generating a transformed dataset through a sequence of transformation operations. In some aspects, the transformation operations include performing certain pre-processing steps on a descriptor (e.g., removing white space, converting text from lower case to upper case, removing invalid special characters). After this pre-processing, the text transformation system performs additional operations in which various lookup tables are used to match portions of the descriptor to standardized tokens and modify the descriptor to include the standardized tokens. A token can be, for example, one or more subsets of characters corresponding to a particular word, phrase, or logical concept. For instance, the descriptor "SRMGTSUP" can be divided into three groups of characters: "SR," "MGMT," and "SUP." These three groups of characters include two tokens, "SR MGMT" and "SUP." that correspond to the phrase "SENIOR MANAGEMENT" and the word "SUPERVISOR." A standardized token to be used for a standardized descriptor can be identified in one or more lookup tables.

The text transformation system can generate a standardized descriptor (e.g., a title such as "SENIOR MANAGEMENT SUPERVISOR") by using various transformation operations involving these lookup tables. For example, certain descriptor portions can be converted to standardized tokens, joint words can be separated (e.g., separating "SRMGTSUP" into "SR," "MGT," and "SUP"), and additional descriptor portions that include partial words and special characters (e.g., "R&D") can be further standardized (e.g., replaced with "RESEARCH AND DEVELOPMENT"). In some aspects, industry-specific transformation operations can also be applied, such as removing site-based tokens (e.g., tokens related to specific locations or cities) and using a standardized scheme for expressing levels of authority associated with certain entities (e.g., replacing "LVL 1" with "LEVEL I").

Certain aspects disclosed herein can improve data processing systems that are used to process textual content. For instance, the text transformation system can gather textual data and format, edit, prepare, or otherwise process text data for further use (e.g., analysis or display). This formatting, editing, and preparing may include replacement of text elements with other text elements, removal or addition of special characters in the text to improve readability, or otherwise transforming textual data such that certain elements are added, deleted, or modified. The transformed textual data can be used in additional data processing (e.g., performing analysis on the textual data), for presentation as display data, or both. The operations performed by the text transformation system can present improvements over existing text-processing systems.

In one example, the transformation operations described herein can create of indexed datasets that allow for faster searching of data than would be possible with existing systems. For instance, to query a common entity type that might have different descriptors, existing solutions require either multiple queries for different, non-standardized descriptors or a more complex query with multiple parameters corresponding to the different, non-standardized descriptors. These existing solutions therefore require more computing resources for processing multiple query parameters, searching disjoint data subsets (i.e., differently indexed records) in a data structure, and combining the disjoint results into a common set of search results. By contrast, a set of entity data generated using techniques described herein can allow a single query to be used for retrieving the same set of search results, thereby reducing the computing resources required for retrieving these results from a data structure. Thus, certain aspects described herein can improve search speeds in data-processing systems.

In another, simplified example, data-processing systems that perform analytical operations, which use descriptors such as job titles, can be improved by efficiently transforming raw textual data into standardized job titles. Certain data-processing systems may receive large numbers of job records with many unique job titles (e.g., over 200 million job records from various client systems, where the job records include nearly 5 million unique job titles). These job records can describe the same job title inconsistently. These inconsistencies can result from, for example, one or more of grammatical errors in data entry, typographical errors in data entry, use of inconsistent cases (e.g., "Business" versus "BUSINESS"), shortened titles (e.g., DIRHR versus "Director Human Resource"), use of abbreviations (e.g., "VP" versus "Vice President"), use of acronyms (e.g., "R&D" versus "research and development"), inconsistent use of spacing, hyphenation, or other special characters (e.g., "Vice President," "Vice-President"), etc.

In this example, existing systems may use "brute force" algorithms to identity a similarity between a given job title and every other job title. An example of a measurement of title similarity is the Levenshtein edit distance, which identifies a minimum number of single-character edits require to transform one string into another. In such a brute force algorithm, the title "STORE MANAGER" is compared to every other title to determine similarities in the titles. For example, "STORE MANAGER" is compared to "STORE ASSOCIATE" to obtain a Levenshtein edit distance of 8, "STORE MANAGER" is compared to "STORE MGR" to obtain a Levenshtein edit distance of 4, and "STORE MANAGER" is compared to "XSR VICE PRESIDENT" to obtain a Levenshtein edit distance of 14. A sufficiently small Levenshtein edit distance indicates that certain job titles (e.g., STORE MANAGER" and "STORE MGR") should be grouped together as referring to the same job title. But this brute force algorithm, when operating on millions of unique job titles, may take weeks or months of processing to complete.

In contrast to these brute force algorithms, certain text-transformation features described herein can transform millions of individual job titles or other descriptors into standardized formats. The transformation operations described herein can involve far fewer processing cycles and other processing resources, thereby allowing millions of individual job titles or other descriptors to be processed and standardized in a matter of hours rather than days or weeks. For example, the transformations can use lookup tables to identify mappings between certain variants of a descriptor (e.g., "STORE MGR," "R&D DIR") to standard versions of tokens, abbreviations, special-character transformations, etc. (e.g., "STORE MANAGER." "RESEARCH AND DEVELOPMENT DIRECTOR," etc.). The use of the lookup tables can allow all job titles or other descriptors to be transformed using a common standard (e.g., the mappings specified in the lookup tables) rather than a brute-force comparison of each descriptor with every other descriptor in a set of textual data. Thus, certain text-transformation features described herein can greatly increase the efficiency with which computing systems that transform textual data may operate.

Example of an Operating Environment

Referring now to the drawings, FIG. 1 depicts an example of a computing system 100 that is usable for efficiently transforming entity descriptors in textual data. This transformation can enable simplified and accurate data processing of the transformed textual data. The computing system 100 is a specialized computing system having various hardware components depicted in FIG. 1 that may be used for processing large amounts of data using a large number of computer processing cycles. The numbers of devices depicted in FIG. 1 are provided for illustrative purposes. Different numbers of devices may be used. For example, while each device, server, and system is shown as a single device, multiple devices may instead be used.

The computing system 100 can include one or more computing devices 102a-c. The computing devices 102a-c may include client devices that can communicate with the text transformation system 106. For example, the computing devices 102a-c may send data to the text transformation system 106 to be processed, may send signals to the text transformation system 106 to control different aspects of the computing environment or the data it is processing. The computing devices 102a-c may interact with the text transformation system 106 via one or more data networks 104. The computing devices 102a-c may include network computers, sensors, databases, or other devices that may transmit or otherwise provide data to text transformation system 106. For example, the computing devices 102a-c may include local area network devices, such as routers, hubs, switches, or other computer networking devices.

Each communication within the computing system 100 (e.g., between client devices, between automated analytical systems 116 and text transformation system 106, or between a server and a device) may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The computing system 100 can also include a text transformation system 106. The text transformation system 106 may be a specialized computer or other machine that processes the data received within the computing system 100. The text transformation system 106 can include one or more processing devices that execute program code, such as a transformation module 108. The program code is stored on a non-transitory computer-readable medium.

The text transformation system 106 may include one or more other systems. For example, the text transformation system 106 may include a database system for accessing the network-attached storage 110, a communications grid, or both. A communications grid may be a grid-based computing system for processing large amounts of data.

The computing system 100 may also include one or more network-attached storage 110. Network-attached storage 110 may store a variety of different types of data organized in a variety of different ways and from a variety of different sources. For example, network-attached storage 110 may include storage other than primary storage located within text transformation system 106 that is directly accessible by processors located therein. Network-attached storage 110 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached storage 110 can include memory devices for storing raw textual data 112 to be transformed into transformed textual data 114 by the text transformation system 106. (In some aspects, the network-attached storage 110 can also store any intermediate or final data generated by one or more components of the computing system 100.) The raw textual data 112 can be provided by one or more computing devices 102a-c, generated by computing devices 102a-c, or otherwise received by the computing system 100 via a data network 104.

The transformation module 108 can execute a set of sequential operations, parallel operations, or some combination thereof for transforming raw textual data 112 into transformed textual data 114. The transformed textual data 114 can be generated by applying one or more textual transformations to entity descriptors that are included in the raw textual data 112. The transformed textual data 114 can be stored in a database or other suitable data structure in the network-attached storage 110, where the database or other suitable data structure includes records used by the automated analytical system 116 to perform analytical operations and generate outputs provided to one or more computing devices 102a-c.

The raw textual data 112 can include data records with descriptors of certain entities. Each descriptor can include a string of characters. In some aspects, the systems from which the raw textual data 112 is received may not impose any data entry constraints on the processes used to generate the raw textual data 112. As a result, a given descriptor string may include any combination of characters (e.g., leading white space, special characters, inconsistent abbreviations, etc.) without regard to any logical scheme. In additional or alternative aspects, even if data entry constraints are imposed on the processes used to generate the raw textual data 112, different systems from which different subsets of the raw textual data 112 are received may use different logical schemes for the data entry processes that generate descriptors. For example, a first system may encode a certain descriptor using a first schema of acronyms and abbreviations (e.g., "SENIOR R&D DIRECTOR") and a second system may encode the same descriptor using a second schema of acronyms and abbreviations (e.g., "SR RESEARCH AND DEV DIR"). Thus, the raw textual data 112 may lack consistently applied descriptors for the same type of entity.

The transformed textual data 114 can include standardized versions of descriptors from the raw textual data 112. The transformation module 108 can generate the transformed textual data 114 by applying textual transformation operations, which use one or more lookup tables 115 for standardizing descriptors, as described herein.

In some aspects, the computing system 100 may also include one or more automated analytical systems 116. The text transformation system 106 may route select communications or data to the automated analytical systems 116 or one or more servers within the automated analytical systems 116. An example of an automated analytical system 116 is a mainframe computer, a grid computing system, or other computing system that executes an analytical algorithm that can determine trends or other analytics with respect to various entities described by the transformed textual data 114.

Automated analytical systems 116 can be configured to provide information in a predetermined manner. For example, automated analytical systems 116 may access data to transmit in response to a communication. Different automated analytical systems 116 may be separately housed from each other device within the computing system 100, such as text transformation system 106, or may be part of a device or system. Automated analytical systems 116 may host a variety of different types of data processing as part of the computing system 100. Automated analytical systems 116 may receive a variety of different data from the computing devices 102a-c, from text transformation system 106, from a cloud network, or from other sources.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other language or combinations of languages may be used to implement the disclosures herein in software to be used in programming or configuring a computing device.

Examples of Entity Descriptor Transformations

The following examples of transforming attributes are provided for illustrative purposes. These illustrative examples involve transforming job titles (e.g., descriptors for entities in certain industries) into standardized job titles. The transformation module 108 can generate a standardized title (or other descriptor) by applying one or more textual transformation operations to a string of text that has been received by the text transformation system 106.

Table 1 depicts examples of various titles that have been transformed from their original, raw form into standardized titles.

TABLE 1

| Initial Identifier (Raw Textual Data) | Standardized Identifier (Transformed Textual Data) |
|---|---|
| StockClkFT>6/29/04<6/25/07-010 | STOCK CLERK FT |
| 6(NONE) | INVALID TITLE |
| ELECTRONIC CATALOG SYS MGR-PHX | ELECTRONICS CATALOG SYSTEM MANAGER |
| 0920DIRDIG | DIRECTOR DIGITAL |
| SRANALYS | SENIOR ANALYST |
| STRRECVG | STORE RECEIVING |
| VICE PRESIDENT/CIO | VP/CIO |
| COST SERVICE | CUSTOMER SERVICE |
| H&S MGR 1 EH&S | HEALTH AND SAFETY MGR 1 ENVIRONMENTAL HEALTH AND SAFETY |
| N/U CASHIER/CLERK | N/U CASHIER CLERK |
| A.V.P. BENEFITS ADMIN. | AVP BENEFITS ADMIN |
| Lead, Brd - Mn & Kid Store 016 | LEAD BRAND MAN AND KID |
| CORP LOG REG FAC MGR TRANS WHS | CORPORATE LOGISTIC REG FACIITY MANAGER TRANS WAREHOUSE |
| 09512-REPRESENTATIVE I, CSV(TP) | REPRESENTATIVE I CSV TP |
| SRREGULATORYCOMPLIANCEANALYST | SENIOR REGULATORY COMPLIANCE ANALYST |
| SRHRADMREP | ADMINISTRATIVE HUMAN RESOURCES REPRESENTATIVE SENIOR |
| RFT LP Agent | RESIDENTIAL FRAMING TECHNICIAN LOSS PREVENTION AGENT |

Modifying data records to include these standardized titles can enable more efficient processing with respect to certain analytical operations. In one example, automated analytical operations that involve job titles (e.g., computing employment statistics, career progression, title diversity, etc.) can be performed more accurately or efficiently after different variations of a given title (e.g., "SR MGR" "SR MANAGER." "Senior Manager" "Sr MGR") are standardized. For instance, programming logic for retrieving and analyzing all data records referring to a senior manager can be simplified (e.g., by requiring only one reference to the standardized "SENIOR MANAGER" descriptor rather than multiple references to the variants "SR MGR," "SR MANAGER" "Senior Manager" "Sr MGR").

Figure 2:
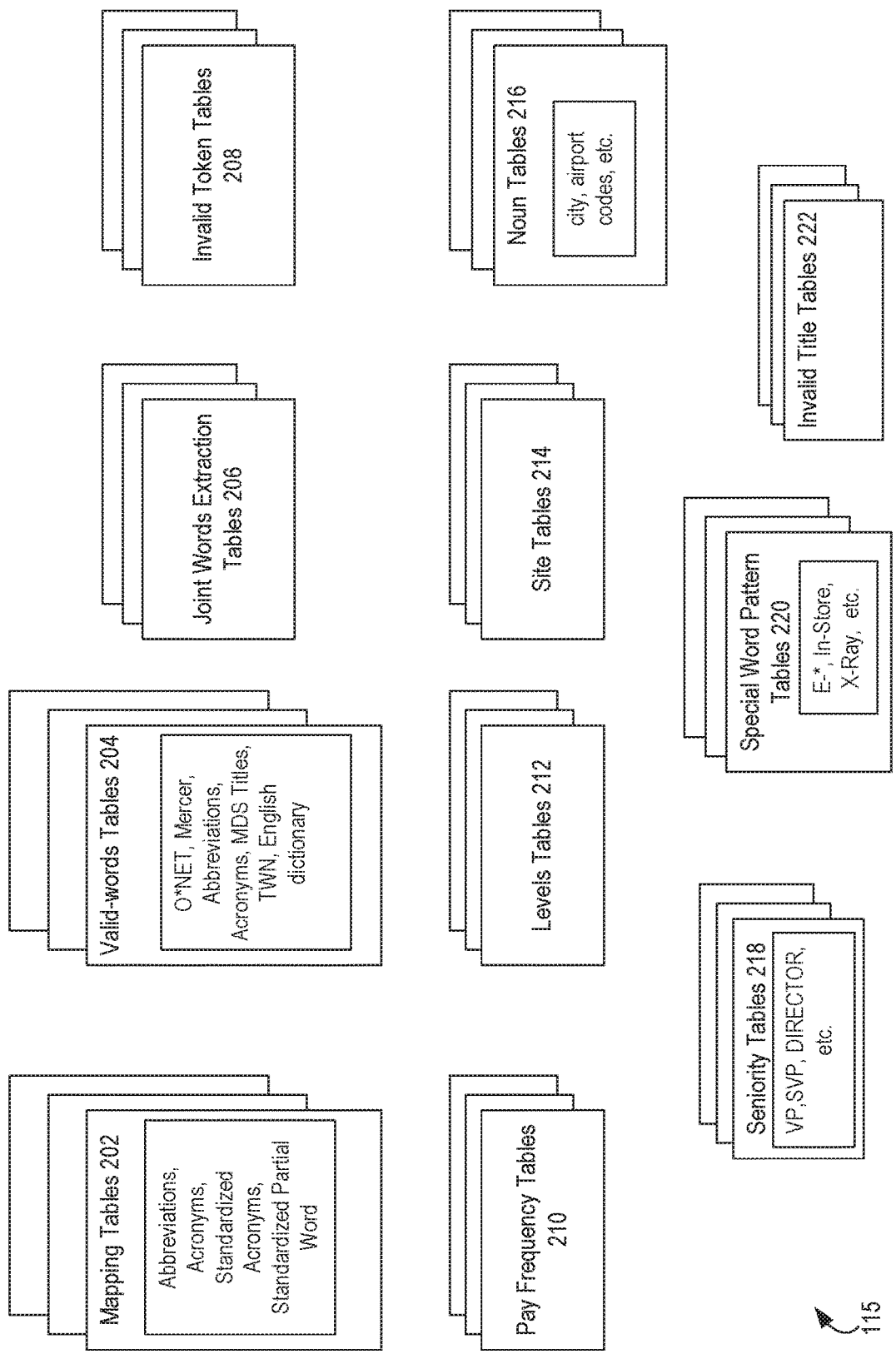
FIG. 2 depicts examples of lookup tables that can used by the text transformation system of FIG. 1, according to some aspects of the present disclosure.

FIG. 2 depicts examples of lookup tables that can be included among the lookup tables 115 and used by the transformation module 108. These lookup tables can include mapping tables 202, valid-words tables 204, joint-words extraction tables 206, invalid token tables 208, pay frequency tables 210, levels tables 212, site tables 214, noun tables 216, seniority tables 218, special word pattern tables 220, and invalid title tables 222.

The lookup tables 115 can, in combination, provide a knowledge base used for transforming textual data. For example, the knowledge base can be used to identify standardized tokens that can be used in descriptors. These standardized tokens that have been identified from the knowledge base can be used by the text transformation system 106 to replace portions of a text descriptor with corresponding standardized tokens.

The mapping tables 202 can include data that identifies associations among standardized tokens that are used by the text transformation system 106 and variants of those tokens. Examples of these tables include abbreviation tables, acronym tables, standardized acronym tables, standardized partial word tables, etc. An abbreviation table can include a standard token (e.g., "VICE PRESIDENT") and one or more abbreviations that may be included in raw textual data 112 to refer to the same logical concept (e.g., "VP," "V.P.," "Veep," etc.). An acronym table can include a standard token (e.g., "BUREAU OF LABOR STATISTICS") and one or more acronyms that may be included in raw textual data 112 to refer to the same logical concept (e.g., "BLS" "B.L.S." etc.). A standardized acronym table can include a standard token in the form of an acronym (e.g., "USPTO") and one or more words or other acronyms that may be included in raw textual data 112 to refer to the same logical concept (e.g., "U.S.P.T.O" "PTO," "U.S. Patent and Trademark Office," etc.). A standardized partial word table can include a standard token (e.g., "DEVELOPMENT") and one or more shortened forms of certain words that may be included in raw textual data 112 to refer to the same logical concept (e.g., "DEV").

The valid-words tables 204 can include one or more tokens (e.g., words, phrases, or both) that have been identified as valid for a particular set of descriptors. In some aspects involving job titles, these tables can include data obtained from government agencies (e.g., O*NET job title data provided by the U.S. Department of Labor), private vendors (e.g., job title data obtained from Mercer), data describing commonly used abbreviations, data describing commonly used acronyms, certain words from English dictionaries or other dictionaries, etc.

The joint-words extraction tables 206 can include mappings of certain strings to corresponding sets of words or other tokens. For example, the text transformation system 106 can use one or more joint-words extraction tables 206 to separate a string such as "SRHRADMREP" into interim tokens "SR," "HR," "ADM," and "REP." This separation operation allows one or more of the interim tokens to be matched to a standardized token (e.g., matching "HR" to "HUMAN RESOURCES," matching "SR" to "SENIOR," etc.). Table 2 depicts examples of other descriptor strings and their corresponding interim tokens after a separation operation.

TABLE 2

| Initial Identifier (Raw Textual Data) | Standardized Identifier (Transformed Textual Data) |
|---|---|
| 0900INVCRLA | INV CRLA |
| 0900MGRLSE | MGR LSE |
| 0920BUYSR1 | BUY SR |
| AsstMgrCanrierPerf&NonMerchLog | ASST MGR CARRIER PERF AND NON MERCH LOG |
| DIR, GENACCFIXED ASSETSGIFTCRD | DIRECTOR GEN ACC FIXED ASSETS GIFT CRD |
| SrTechRiskAnalyst,ThirdParty | SR TECH RISK ANALYST THIRD PARTY |
| CARDCUSTOMERSERVICEADVOCATEII | CARD CUSTOMER SERVICE ADVOCATE II |
| SRMOBILEUSEREXPERIENCEDESIGNER | SR MOBILE USER EXPERIENCE DESIGNER |
| SRREGULATORYCOMPLIANCEANALYST | SR REGULATORY COMPLIANCE ANALYST |

TABLE 2-continued

| Initial Identifier (Raw Textual Data) | Standardized Identifier (Transformed Textual Data) |
|---|---|
| WORKFORCEMANAGEMENTTEAMLEAD | WORKFORCE MANAGEMENT TEAM LEAD |
| SERVICEPRODUCTIONSUPERVISORCPO | SERVICE PRODUCTION SUPERVISOR CPO |
| SRHRADMREP | ADMINISTRATIVE HUMAN RESOURCES REPRESENTATIVE SENIOR |
| RET LP Agent | AGENT FRAMING LOSS PREVENTION RESIDENTIAL TECHNICIAN |

In some aspects, the joint-words extraction tables 206 can be generated using the frequency with which certain tokens occur in the raw textual data 112 or other textual data. For example, the transformation module 108 or other suitable program code can determine that terms such as "HR," "SR." and "REP" occur in a large number of records in the raw textual data 112. Based on this high-frequency occurrence of these terms, the terms can be added to a joint-words extraction table 206. The transformation module 108 can match portions of a string (e.g., "SRHRADMREP") to terms in the joint-words extraction tables 206 to determine or estimate how a given string should be separated into tokens (e.g., by separating "SRHR" into "SR" and "HR").

The invalid token tables 208 can include a list of invalid tokens. The invalid words, phrases, or both that have been identified as invalid for a particular set of descriptors. For example, certain words or phrases may have no relevance for a particular industry associated with a set of descriptors being analyzed. Because these words or phrases have no relevance, they are of limited or no use in transforming a string of text into a standardized title for that industry. The words or phrases are therefore identified as "invalid" tokens that should be removed from a particular text string during a process of transforming the text string into a standardized job title.

The pay frequency tables 210 can include words indicative of pay frequency. Examples of pay frequency data include words or phrases such as (but not limited to) "hourly," "monthly," "annually," etc.

The levels tables 212 can include data describing different levels of authority possessed by an entity (e.g., "LEVEL 1," "LEVEL 2," "SENIOR." "MID-LEVEL," etc.). The text transformation system 106 can use the levels tables 212 to transform different descriptors, which include indications of an entity's level within an organization, into standardized tokens that include corresponding information about the entity's level within the organization. For example, a job title with a single number on the end (e.g., "Operations Scheduler 2," PRODUCT DESIGN ENGINEER 3," "SUPPORT SPECIALIST—LEVEL 4," etc.) can be converted into a set of tokens with a roman numeral indicating the level (e.g., "OPERATIONS SCHEDULER II," "PRODUCT DESIGN ENGINEER III," "SUPPORT SPECIALIST LEVEL IV," etc.). In some aspects, a levels table can include an association between a certain title (or other descriptor) (e.g., "TECHNICAL SYSTEMS ENGINEER," "ASSOCIATE," etc.) and a number of levels that may be applied to the title or descriptor (e.g., "I, II, and III," "JUNIOR, MID-LEVEL, SENIOR").

The site tables 214 can include data describing different geographical locations. In some aspects, the text transformation system 106 can use one or more site tables 214 to remove site-based tokens from a title (or other descriptor). For instance, a site table 214 may identify "Mayberry" and "Castle Rock" as cities. The text transformation system 106 can determine that both "Mayberry Store Manager" and "Castle Rock Store Manager" should be transformed to "Store Manager" by removing the "Mayberry" token and the "Castle Rock" token.

The noun tables 216 can include commonly used proper nouns that may be included in job titles or other descriptors. Examples of these proper nouns include city names, airport codes, etc. In some aspects, the text transformation system 106 can use one or more noun tables 216 to remove certain noun tokens from a title (or other descriptor). For instance, a noun table 216 may identify "ATL" and "SFO" as airport codes that should be removed from a title. The text transformation system 106 can determine that both "ATL Controller" and "SFO Controller" should be transformed to "Controller" by removing the "ATL" token and the "SFO" token.

Other examples of descriptors that can be modified using a noun table 216 are depicted in Table 3.

TABLE 3

| Initial Identifier (Raw Textual Data) | Before Removal of Noun Token | After Removal of Noun Token |
| --- | --- | --- |
| RVP- MID-ATLANTIC | RVP MID ATLANTIC | RVP |
| RVP- CENTRAL | RVP CENTRAL | RVP |
| RVP- SOUTH ATLANTIC | RVP SOUTH ATLANTIC | RVP |
| RVP- SOUTH | RVP SOUTH | RVP |

Table 3 includes un-transformed descriptors (e.g., "RVP—MID-ATLANTIC," "RVP—SOUTH ATLANTIC," etc.) and their corresponding tokens after removal of noun tokens (e.g., removal of "MID ATLANTIC," "SOUTH ATLANTIC," etc. to obtain "RVP").

The seniority tables 218 can include seniority data identifying different managers or other leadership positions. Examples of seniority data include data such as "vice president," "senior vice president," "director," etc.

The special word pattern tables 220 can include prefixes, suffixes, or other text that may be appended or otherwise added to a given title (or other descriptor), where a special word pattern indicates a commonly used characteristic of a particular position or industry. In an example, the special word pattern "e-" is a prefix indicating an electronic state (e.g., "e-mail") or an association with an online service (e.g., "e-commerce," "e-marketing," etc.). Additionally or alternatively, the special word pattern tables 220 can include common words that form compound modifiers (e.g., "in-store," "x-ray," etc.).

The invalid title tables 222 can include a list of titles that, when standardized, are considered invalid. Examples of invalid titles can include words or phrases such as (but not limited to) "DO NOT USE," "NA," "NONE," etc.

In some aspects, the automated analytical system 116 or other online computing system can service queries for transformed datasets indexed in accordance with standardized entity descriptors obtained from the transformed textual data 114. For instance, the automated analytical system 116 can receive a request from one or more computing devices 102a-c to perform an analytical operation involving a query. The automated analytical system 116 can service the query by extracting a query parameter having a particular standardized entity descriptor for the entity type (e.g., a job title). The automated analytical system 116 further services the query by parsing a transformed dataset, such as the transformed textual data 114, that is indexed in accordance with standardized entity descriptors. If any records from the parsed dataset have index values with a standardized entity descriptor, the automated analytical system 116 retrieves those records and returns them as a search result. Returning the records as a search result can include, for example, transmitting the records to a client device, providing the search results as an input to an analytical operation, etc.

Figure 3:
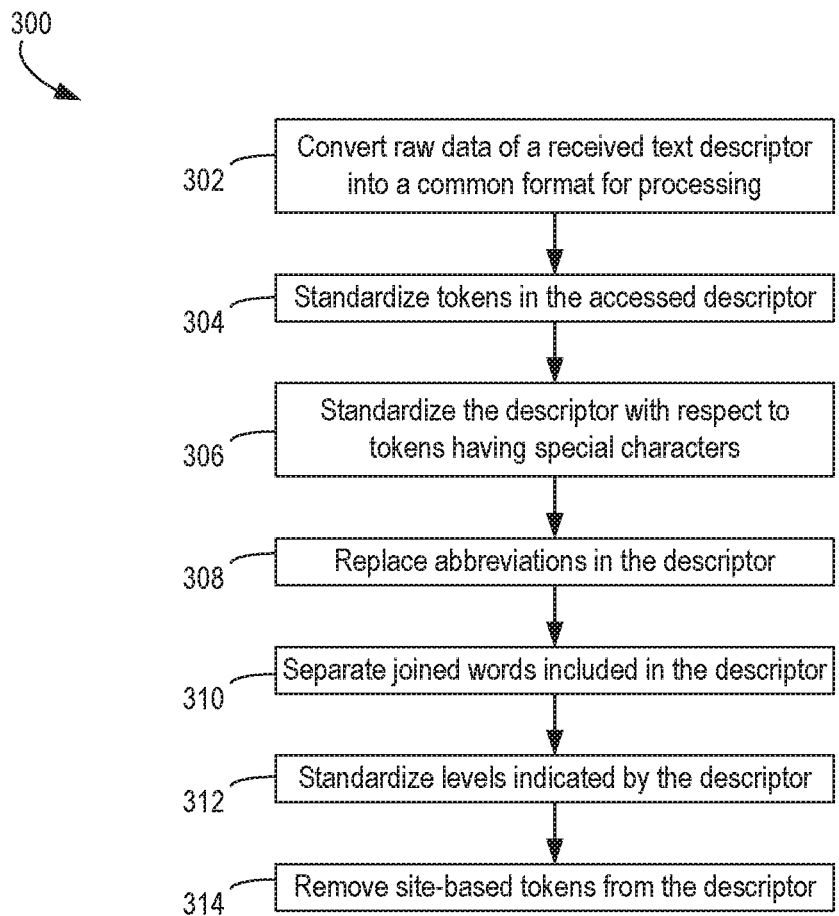
FIG. 3 depicts an example of a process for transforming entity descriptors that are included in textual data, according to some aspects of the present disclosure.

FIG. 3 is a flow chart depicting an example of a process 300 for transforming entity descriptors that are included in textual data. For illustrative purposes, the process 300 is described with reference to the implementation depicted in FIG. 1 and various other examples described herein. But other implementations are possible.

In some aspects, the process 300 can be used to transform a set of different entity descriptors (e.g., a set of different job titles) that refer to a common entity type (e.g., the same job or position in an industry) into a standardized entity descriptor (e.g., a standardized job title). The process 300 can be executed for each descriptor in the set of entities, and thereby output the standardized descriptor.

The process 300 can include converting raw data of a received text descriptor into a common format for processing, as depicted in block 302. The transformation module 108 can be executed by one or more suitable processing devices to implement block 302 by performing a set of conversion operations. The transformation module 108 can receive the text descriptor by accessing the text descriptor from a database or other data structure stored in a non-transitory computer-readable medium. Block 302 can include applying modifications to the accessed descriptor that are performed for some or all descriptors (e.g., job titles). These modifications can enable subsequent processing operations in the process 300 to be performed more accurately or efficiently.

One example of a conversion operation that may be performed at block 302 is ensuring all letters of a text descriptor are in a common case (e.g., by converting letters from lower case to upper case). Using a common case for the text descriptor allows for string-insensitive comparisons of one or more portions of the text descriptor to one or more tokens (or other data) in one or more of the lookup tables 115.

Another example of a conversion operation that may be performed at block 302 is trimming or otherwise reducing white space in the text descriptor. For instance, the descriptor " TRAFFIC CONTROLLER" can be transformed into "TRAFFIC CONTROLLER" by removing the leading white space prior to the word "TRAFFIC." In another example, extra spaces in the descriptor "EXEC.  TRFFIC CTLR" can be removed to yield the transformed descriptor "EXEC. TRFFIC CTLR."

Another example of a conversion operation that may be performed at block 302 is the removal of special characters that the transformation module 108 can identify as invalid. For instance, the transformation module 108 can determine that some (but not all) special characters included in a descriptor are considered invalid. The transformation module 108 can access a list of invalid special characters in a lookup table or other data structure in a non-transitory computer-readable medium. Examples of these characters include ">," "%," "<," "$," "#," etc.

Another example of a conversion operation at block 302 is removing invalid tokens. For instance, the transformation module 108 can access one or more invalid token tables 208 from a non-transitory computer-readable medium. The transformation module 108 can compare one or more of the tokens in a given text descriptor with one or more tokens stored in the invalid token tables 208. The transformation module 108 can remove any tokens from the text descriptor that match tokens stored in the invalid token tables 208. In some aspects, removing invalid tokens can include removing repeating letters (e.g., "AAA," "ZZZ," etc.) from the beginning of a descriptor.

Another example of a conversion operation at block 302 is removing non-alphabetical characters from the beginning of an accessed descriptor. For example, the transformation module 108 can transform the descriptor "#584—REST CLERK" into "REST CLERK" by removing the set of characters "#584-," which includes numeric and special characters.

Another example of a conversion operation that may be performed at block 302 is determining if the descriptor matches an invalid title (or other descriptor). For example, the transformation module 108 can access one or more invalid title tables 222 from a non-transitory computer-readable medium. The transformation module 108 can compare the text descriptor to one or more titles stored in the invalid title tables 222. The transformation module 108 can determine that the accessed descriptor is an invalid title (or other descriptor) based on the accessed descriptor matching a title (or other descriptor) stored in the invalid title tables 222. In some aspects, the process 300 can terminate in response to the transformation module 108 detecting an invalid title. The transformation module 108 can output a message for presentation at a display device indicating that the accessed descriptor has been identified as invalid.

The process 300 can also include standardizing tokens in the accessed descriptor, as depicted in block 304. The transformation module 108 can be executed by one or more suitable processing devices to implement block 304. Standardizing tokens can include converting a token into a standardized version of the token. In some aspects, one or more token standardization operations are performed after the operations described above with respect to block 302.

The following examples involve non-standardized tokens that have been transformed into standardized tokens. For example, the token "JUNIOR" can be transformed into a corresponding standard token "JR," the token "PART TIME" can be transformed into a corresponding standard token "PT," the token "F/T" can be transformed into a corresponding standard token "FT," etc. The transformation module 108 can transform tokens into standardized tokens by accessing one or more mapping tables 202 from a non-transitory computer-readable medium. The mapping tables 202 can identify an association between the standard token "JR" and one or more variants (e.g., "JUNIOR," "JR.," etc.), an association between the standard token "PT" and one or more variants (e.g., "PART TIME," "PART-TIME," "P/T" etc.), and an association between the standard token "FT" and one or more variants (e.g., "FULL TIME," "FULL-TIME," "F/T" etc.). The transformation module 108 can use these associations to replace the variants "JUNIOR." "PART TIME," and "F/T" with their respective standardized tokens "JR," "PT," and "FT."

The process 300 can also include standardizing the descriptor with respect to tokens having special characters, as depicted in block 306. The transformation module 108 can be executed by one or more suitable processing devices to implement block 306. The special characters used in block 306 may be different from the special characters removed from the descriptor in block 302. For example, certain combinations of letter and special characters (e.g., a forward slash, an ampersand, etc.) may be commonly used in a relevant industry (e.g., using "A/P" to refer "Accounts Payable," "R&D" to refer to "research and development," etc.). Therefore, rather than removing these special characters at block 302, the transformation module 108 uses these special characters to perform certain standardization operations.

The transformation module 108 can use one or more lookup tables to standardize the descriptor with respect to one or more special characters. For example, the transformation module 108 can use one or more mapping tables 202 that include relevant special characters to replace certain variants of a descriptor (e.g., "R&D") with its corresponding standardized token (e.g., "Research and Development"). Additional examples of standardizing descriptors with respect to one or more special characters are described herein with respect to FIG. 4.

The process 300 can also include replacing abbreviations in the descriptor, as depicted in block 308. The transformation module 108 can be executed by one or more suitable processing devices to implement block 308. For example, the transformation module 108 can use the mapping tables 202 to replace tokens that include abbreviations or short words (e.g., "MGR" "MKTG," "OPS," etc.) with their corresponding long forms (e.g., "MANAGER," "MARKETING," "OPERATIONS," etc.). A long form of an abbreviation can be, for example, a version of an abbreviated term that includes a full word or phrase represented by a shortened word or phrase in the abbreviation. Table 4 depicts examples of descriptors that have been transformed by replacing abbreviations in block 308.

TABLE 4

| Initial Identifier (Raw Textual Data) | Standardized Identifier (Transformed Textual Data) |
| --- | --- |
| Mgr eComm Prod Mgmt DEV | MANAGER E-COMMERCE PRODUCT MANAGEMENT DEVELOPER |
| SR MKTG SPEC, DIG MKTG & EMAIL | SENIOR MARKETING SPECIALIST DIGITAL MARKETING AND EMAIL |
| HR CRD-HLTH CLMS ADM | HUMAN RESOURCES CO-ORDINATOR HEALTH CLAIMS ADMINISTRATIVE |
| OPS SUPV 4, MAT CTRL/LOG | OPERATIONS SUPERVISOR, 4 MATERIAL CONTROL LOGISTIC |
| SK ASST DIR FRT END/CUST SRV-E | SK ASSISTANT DIRECTOR FREIGHT END CUSTOMER SERVICE E |
| OPS SUPV 5, MAT CTRL/LOG | OPERATIONS SUPERVISOR 5 MATERIAL CONTROL LOGISTIC |
| SLS ASSOC LD-MKT PRO | SALES ASSOCIATE LEADER MARKET PROFESSIONAL |

The process 300 can also include separating joined words included in the descriptor, as depicted in block 310. The transformation module 108 can be executed by one or more suitable processing devices to implement block 310. In some aspects, the transformation module 108 can access one or more joint-words extraction tables 206 from a non-transitory computer-readable medium. The joint-words extraction tables 206 can identify associations between certain strings, in which two or more words are joined, and corresponding sets of words, in which the words are properly separated. In additional or alternative aspects, if one or more tokens in a descriptor is not included in one or more of the invalid token tables (i.e., the transformation module 108 has not removed the tokens at block 302), block 310 can include separating a string of characters into separate tokens based on the length of the string. In additional or alternative aspects, the transformation module 108 can remove duplicate tokens.

The process 300 can also include standardizing authority levels indicated by the descriptor, as depicted in block 312. The transformation module 108 can be executed by one or more suitable processing devices to implement block 312. The transformation module 108 can perform block 312 by accessing one or more levels tables 212. The transformation module 108 can compare one or more tokens in the descriptor to data in one or more levels tables 212. Based on this comparison, the transformation module 108 can replace one or more tokens indicative of a level (e.g., an amount of authority possessed by an entity) with a standardized token representing that authority. For instance, if a job title (or other descriptor) has a final token that is a single digit numeral, the transformation module can convert the final token to a roman numeral (e.g., transforming the descriptor "MANAGER 2" into "MANAGER II" by replacing the final token "2" with the standardized level token "II"). Table 5 depicts examples of descriptors that have been transformed into standardized descriptors with standardized level tokens.

TABLE 5

| Initial Identifier (Raw Textual Data) | Standardized Identifier (Transformed Textual Data) |
|---|---|
| Operations Scheduler 2 | OPERATIONS SCHEDULER II |
| Optical Assistant Level 2 | OPTICAL ASSISTANT LEVEL II |
| PC TECHNICIAN 2 | PC TECHNICIAN II |
| PRINTING TECH 1 | PRINTING TECH I |
| PRODUCT DESIGN ENGINEER 3 | PRODUCT DESIGN ENGINEER III |
| SR PROJECT MANAGER - LEVEL 1 | SENIOR PROJECT MANAGER LEVEL I |
| SUPPORT SPECIALIST - LEVEL 4 | SUPPORT SPECIALIST LEVEL IV |
| SUPPORT SPECIALIST - LEVEL 7 | SUPPORT SPECIALIST LEVEL VII |

The process 300 can also include removing site-based tokens from the descriptor, as depicted in block 314. The transformation module 108 can be executed by one or more suitable processing devices to implement block 314. For example, the transformation module 108 can access one or more site tables 214. The transformation module 108 can compare one or more tokens in the descriptor to one or more site-based tokens stored in the site tables 214. If the transformation module 108 determines that a token in the descriptor matches a site-based token stored in a site table 214, the transformation module 108 can transform the descriptor by removing the site-based token.

Table 6 depicts examples of descriptors that have been transformed into standardized descriptors by removing site-based tokens.

TABLE 6

| Initial Identifier (Raw Textual Data) | Standardized Identifier (Transformed Textual Data) |
|---|---|
| CSM STR #959 | CSM |
| CSM STR 098 | CSM |
| Store Maint Assoc Store 0013 | STORE MAINTENANCE ASSOCIATE |
| Store Maint Assoc Store 0037 | STORE MAINTENANCE ASSOCIATE |
| Store Maint Assoc Store 0043 | STORE MAINTENANCE ASSOCIATE |
| Lead, Stock Store 0070 | LEAD STOCK |
| Lead, Stock Store 0071 | LEAD STOCK |
| Manager, Merch - F21 Store 023 | MANAGER MERCHANDISE |
| Manager, Merch - F21 Store 032 | MANAGER MERCHANDISE |

In this example, the transformation module 108 has removed site-based tokens that identify particular locations (e.g., "STR #959," "Store 0013," etc.).

In some aspects, the transformation module 108 can perform one or more post-processing operations to further transform a standardized descriptor after the blocks depicted in FIG. 3 have been performed. One example of these post-processing operations is removing noun tokens. For example, the transformation module 108 can access one or more noun tables 216 and determine if the descriptor includes any tokens matching a noun token in a nouns table. If the descriptor includes any tokens matching a noun token in a nouns table, the transformation module 108 can remove the noun token from the descriptor.

Another example of these post-processing operations is reordering tokens in the descriptor. For instance, the transformation module 108 can reorder tokens using a bag-of-words model, in which grammar and original word order are disregarded and multiplicity of words is maintained. Additionally or alternatively, the transformation module 108 can reorder tokens alphabetically.

Another example of these post-processing operations is removing punctuation. For instance, if a title (or other descriptor) ends with a punctuation mark after the other operations in process 300 have been performed, the transformation module 108 can remove the ending punctuation mark (e.g., transforming "SENIOR PROGRAMMER-" to "SENIOR PROGRAMMER" by removing the ending hyphen). Another example of these post-processing operations includes removing numbers from the descriptor.

Another example of these post-processing operations is determining whether the standardized descriptor is an invalid descriptor. For example, the transformation module 108 can access one or more invalid title tables 222 from a non-transitory computer-readable medium. The transformation module 108 can compare the text descriptor to one or more titles stored in the invalid title tables 222. The transformation module 108 can determine that the accessed descriptor is an invalid title (or other descriptor) based on the accessed descriptor matching a title (or other descriptor) stored in the invalid title tables 222. In some aspects, the transformation module 108 can output a message for presentation at a display device indicating that the accessed descriptor has been identified as invalid.

In some aspects, at each of the blocks in the process 300, the transformation module 108 can count the number of transformation operations that have been performed on a text descriptor. For instance, the transformation module 108 can count the number of transformation operations that occurred with respect to a particular block. In a simple example, transforming "PART TIME SALES ASSOC" into "PART TIME SALES ASSOCIATE" involves two transformation operations (e.g., replacing a first token, "PART TIME," with its standardized token "PT" and replacing a second token, "ASSOC," with its standardized token "ASSOCIATE"). A running total number of transformation operations can be maintained for a given descriptor as the process 300 executes. In other aspects, the count of performed transformation operations can be omitted for one or more of the blocks in the process 300.

In additional aspects, at each of the blocks in the process 300, the transformation module 108 can compute a confidence or other standardization metric. In one example, the transformation module 108 can compute a confidence or other standardization metric based on how many tokens in a current version of a transformed descriptor (e.g., the version of the descriptor at a particular point in the process 300) match standardized tokens that appear in one or more of the lookup tables 115. For instance, if the transformation module 108 can match three out of four tokens from a current version of the transformed descriptor to standardized tokens that appear in one or more of the lookup tables 115, the transformation module 108 can determine a confidence of 75% for that version of the transformed descriptor. In other aspects, the computation of a confidence (or other standardization metric) can be omitted for one or more of the blocks in the process 300.

In some aspects, a confidence metric can be used to generate suggestions to employers or other data sources regarding the schema used to assign job titles or other descriptors. For example, if a large number of job titles for an employer have low confidence values even after standardization, these low confidence values can indicate that the employer uses non-standardized terminology with respect to the relevant industry. A low confidence value can be a confidence metric below a user-specified threshold confidence metric. In response to determining these lower confidence values, the text transformation system 106 can transmit a notification, suggestion, or other message to a computing device associated with the employer. The message can indicate that the employer should revise its job title schema (or other descriptor schema) to incorporate standardized terminology for a relevant industry.

Other standardization metrics can also be determined using the transformation module 108. For instance, in some aspects, the transformed textual data 114 can be analyzed to determine a diversity metric, which indicates how different the job titles are for a particular employer or industry. In additional aspects, the text transformation system 106, in response to determining that the amount of diversity is below a threshold or is otherwise too low, can transmit a notification, suggestion, or other message to a computing device associated with the employer. The message can indicate that the employer should revise its job title schema to increase the diversity in titles.

In additional or alternative aspects, a reduction metric can be determined using the text transformation system 106. The reduction metric can indicate a reduction in the number of unique job titles or other descriptors in the raw textual data. For example, if an original set of job title data from an employer includes a large number of unique titles, but the transformed job data for the employer includes much smaller number of unique titles, the reduction metric can indicate an issue in how job titles are assigned (e.g., insufficient diversity in job titles, excessive reliance on site-based descriptors) or how job title data is entered (e.g., an excessive number of data entry errors inflating the number of "unique" titles).

The transformed textual data 114 that is generated using FIG. 3 can be used to perform one or more analytical operations. In some embodiments, one or more of the text transformation system 106, the automated analytical system 116, or both receive requests from client devices (e.g., one or more computing devices 102*a-c*) to perform one or more analytical operations. An analytical operation can involve one or more queries to a database or other data structure in which the transformed textual data 114 is stored. The query can be service by a processing device retrieving, from a data structure storing the transformed textual data 114, one or more records by using a standardized entity descriptor as a query parameters (e.g., retrieving all records having a job title matching the standardized entity descriptor). Servicing a query using the transformed textual data 114, which includes standardized entity descriptors, can be more efficient with respect to computing resources (e.g., network bandwidth, processing cycles, etc.) as opposed to servicing multiple queries for non-standardized descriptors that all refer to a common entity type.

Any suitable analytical operation can be performed on the transformed textual data 114. In some aspects, the transformed textual data 114 can be analyzed to determine salary levels offered by different employers for the same position in an industry, employer retention with respect to certain positions for different employers in an industry, etc. These comparisons of different employers may be infeasible in the absence of the standardization operations performed by the text transformation system 106. In additional or alternative aspects, the transformed textual data 114 can be analyzed to identify or analyze the employment rates and positions of graduates from colleges, universities, or other education institutions. The availability of standard job titles (i.e., standardized descriptors in transformed job records) can allow the number of graduates in a certain position to be accurately identified. In additional or alternative aspects, the transformed textual data 114 can be analyzed to develop automated compensation benchmarking suggestions, automated career path suggestions, automated salary band generations, etc.

Figure 4:
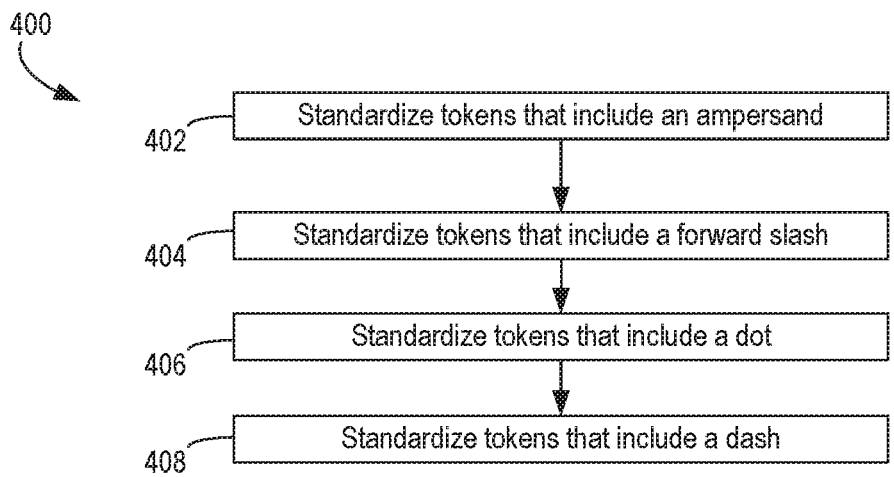
FIG. 4 depicts an example of a process for standardizing special characters in a text descriptor, according to some aspects of the present disclosure.

FIG. 4 is a flow chart depicting an example of a process 400 for standardizing special characters in a text descriptor. The process 400 can be used to implement block 306 of the process 300. For illustrative purposes, the process 400 is described with reference to the implementation depicted in FIGS. 1-3 and various other examples described herein. But other implementations are possible.

In block 402, the process 400 involves standardizing tokens that include an ampersand. One or more processing devices can execute the transformation module 108 to implement block 402. The transformation module 108 can determine if a certain token (e.g., a set of characters) includes the ampersand. If so, the transformation module 108 can access one or more of the lookup tables 115 (e.g., the mapping tables 202) from a non-transitory computer-readable medium. The transformation module 108 can determine if the token having the ampersand matches any of the entries in an accessed lookup table. In some aspects, the transformation module 108 can replace the token having the ampersand with its corresponding standardized token (i.e. a word or phrase) from the accessed lookup table. In additional or alternative aspects, the transformation module 108 can remove the ampersand from the token and replace the ampersand with the word "AND." For example, an ampersand may be replaced with the word "AND" if the length of the token with the ampersand is greater than six characters (e.g., transforming "PLANNING&FINANCE" into "PLANNING AND FINANCE"). Table 7 depicts examples of descriptors that have been standardized with respect to one or more tokens having an ampersand.

TABLE 7

| Initial Identifier (Raw Textual Data) | Standardized Identifier (Transformed Textual Data) |
| --- | --- |
| EVP & CFO Planning&Finance | EVP AND CFO PLANNING AND FINANCE |
| EVP & PRES, OL, MKTG, PRICG&FS | EVP AND PRES OL MKTG PRICG AND FS |
| MGR-R&D STRATEGY & C | MGR- RESEARCH AND DEVELOPMENT STRATEGY AND C |
| EVP & CFO Planning&Finance | EVP AND CFO PLANNING AND FINANCE |
| Director, Fin Plan&Anlysis | DIRECTOR FIN PLAN AND ANLYSIS |
| M&A | MERGERS AND ACQUISITION |

In block 404, the process 400 involves standardizing tokens that include a forward slash. One or more processing devices can execute the transformation module 108 to implement block 404. The transformation module 108 can determine if a certain token (e.g., a set of characters) includes the forward slash. If so, the transformation module 108 can access one or more of the lookup tables 115 (e.g., the mapping tables 202) from a non-transitory computer-readable medium. The transformation module 108 can determine if the token having the forward slash matches any of the entries in an accessed lookup table. In some aspects, the transformation module 108 can replace the token having the forward slash with its corresponding standardized token from the accessed lookup table. In additional or alternative aspects, the transformation module 108 can remove the forward slash from the token and replace the forward slash with a space. For example, a forward slash may be replaced with a space if the length of the token with the forward slash is greater than six characters (e.g., transforming "MERCH/VISUAL" into "MERCH VISUAL"). Table 8 depicts examples of descriptors that have been standardized by replacing one or more tokens having a forward slash with corresponding standardized tokens.

TABLE 8

| Initial Identifier (Raw Textual Data) | Standardized Identifier (Transformed Textual Data) |
| --- | --- |
| S/A STR 430 | S/A STR 430 |
| D/C MDSE CTRL REP | D/C MDSE CTRL REP |
| SR MERCH/VISUAL HL/RCVG 018 | SR MERCH VISUAL HLRCVG 018 |
| 62-N/U PHARMACY TECH | N/U PHARMACY TECHNICIAN |
| N/U RX TECH IN TRAIN PRIOR EXP | N/U RX TECH IN TRAIN PRIOR EXP |

In block 406, the process 400 involves standardizing tokens that include a dot (e.g., a period). One or more processing devices can execute the transformation module 108 to implement block 406. The transformation module 108 can determine if a certain token (e.g., a set of characters) includes the dot. If so, the transformation module 108 can access one or more of the lookup tables 115 (e.g., the mapping tables 202) from a non-transitory computer-readable medium. The transformation module 108 can determine if the token having the dot matches any of the entries in an accessed lookup table. In some aspects, the transformation module 108 can replace the token having the dot with its corresponding standardized token from the accessed lookup table. In additional or alternative aspects, the transformation module 108 can remove the dot from the token and replace the dot with a space. For example, a dot may be replaced with a space if the length of the token with the dot is greater than six characters (e.g., transforming "DIST.OPS" into "DIST OPS"). Table 9 depicts examples of descriptors that have been standardized by replacing one or more tokens having a dot with corresponding standardized tokens.

TABLE 9

| Initial Identifier (Raw Textual Data) | Standardized Identifier (Transformed Textual Data) |
| --- | --- |
| REP., SR. CUST. SVC. | REP SR CUST SVC |
| SR ACCTS. REC. REP. | SR ACCTS REC REP |
| DIST. OPS. MGR., D02 | DIST OPS MGR D02 |
| DIST. OPS. MGR., D10 | DISTOPS MGR D10 |
| SR. V.P., R.E./CONSTRUCTION | SR VP R E CONSTRUCTION |
| VP. DIR. SAFETY RISK MGMT. | VP DIR SAFETY RISK MGMT |

In block 408, the process 400 involves standardizing tokens that include a dash (e.g., a hyphen, an em dash, an en dash, etc.). One or more processing devices can execute the transformation module 108 to implement block 408. The transformation module 108 can determine if a certain token (e.g., a set of characters) includes the dash. If so, the transformation module 108 can access one or more of the lookup tables 115 (e.g., the mapping tables 202) from a non-transitory computer-readable medium. The transformation module 108 can determine if the token having the dash matches any of the entries in an accessed lookup table. In some aspects, the transformation module 108 can replace the token having the dash with its corresponding standardized token from the accessed lookup table. In additional or alternative aspects, the transformation module 108 can remove the dash from the token and replace the dash with a space. For example, a dash may be replaced with a space if the length of the token with the dash is greater than six characters (e.g., transforming "SEASONAL-SUPPORT" into "SEASONAL SUPPORT"). Table 10 depicts examples of descriptors that have been standardized by with respect to one or more tokens having dashes.

TABLE 10

| Initial Identifier (Raw Textual Data) | Standardized Identifier (Transformed Textual Data) |
| --- | --- |
| Store Mgr (non-CA non-expt) | STORE MGR NON CA NON-EXEMPT |
| SEASONAL-SUPPORT | SEASONAL SUPPORT |
| E-BUSINESS SPEC.-PRO | E-BUSINESS SPEC PRO |
| SET-UP MECHANIC B-2 | SET-UP MECHANIC B 2 |
| E-BUS SOLUTION PROJ MGR-SPS | E-BUS SOLUTION PROJ MGR SPS |
| NYC4-Z5-UN RX U-GRADINTRN YR5 | NYC4 Z5 UN RX U-GRAD INTRN YR5 |

In some aspects, the operations described above with respect to processes 300 and 400 can be performed in the order depicted in FIGS. 3 and 4. But other implementations are possible. For example, a text transformation process can be optimized using at least some of the transformation operations described above with respect to processes 300 and 400. The optimization can also be performed using one or more standardization metrics (e.g., confidence score, number of transformation operations, etc.). In some aspects, the optimization can be performed using inputs to a development environment that is used to author or modify program code of the transformation module 108. In additional or alternative aspects, the optimization can be performed in an automated (or partially automated) manner by the transformation module 108 itself.

In aspects involving an optimization of the text transformation process, the text transformation process can be performed iteratively, with one or more iterations involving modifications to the text transformation process that are performed based on the standardization metrics. For example, the text transformation process can be modified if a threshold metric is greater than one or more standardization metrics for the completed text transformation process. Examples of modifying the text transformation process include adjusting one or more of the lookup tables 115, adjusting the order of one or more operations described above with respect to processes 300 and 400, etc.

Additionally or alternatively, one or more standardization metrics can be computed after each transformation operation is performed and used to optimize a text transformation process. For instance, if a standardization metric changes in a manner that indicates improved performance between one transformation operation and a subsequent transformation operation (e.g., an increase in confidence from one operation to the next), this trend in the standardization metric can indicate a preferable order of the transformation operations. The transformation module 108 or other program code can be executed to compute, in a first iteration, first and second standardization metrics for first and second conversion operations, respectively. If a standardization metric changes in a manner that indicates decreased performance between one transformation operation and a subsequent transformation operation (e.g., an increase in confidence from one operation to the next), this trend in the standardization metric can indicate a deficiency in the order of the transformation operations, a deficiency in one or more of the lookup tables 115, or both. The text transformation process can be modified by adjusting one or more of the lookup tables 115, adjusting the order of one or more operations described above with respect to processes 300 and 400, etc. For instance, if the second standardization metric is less than the first standardization metric or otherwise has a different value indicating decreased performance, the transformation module 108 or other program code can be executed to modifying an order of the conversion operations. In a second iteration, updated first and second standardization metrics are computed for first and second conversion operations, respectively. If the second standardization metric no longer has a different value with respect to the first standardization metric indicating decreased performance, the order of conversion operations can be maintained.

In additional or alternative aspects, the transformation module 108 can perform one or more context-based standardization operations based on patterns that the text transformation system 106 can learn via an n-gram analysis on textual data (e.g., the raw textual data 112, the transformed textual data 114, etc.) stored in the network-attached storage 110. The context-based standardization operations can transform an initial descriptor, which includes one or more abbreviated (or otherwise shortened) words or phrases with multiple potential mappings, into an accurate standardized descriptor.

For example, the text transformation system 106 can receive or otherwise access a first raw job title such as "INFO TECH PROF" and a second raw job title such as "TECH SUPPORT." Both of these raw job titles (i.e., initial descriptors) include the term "TECH," which can be a shortened version of "TECHNOLOGY" and a shortened version of "TECHNICAL." The transformation module 108 can correctly map "TECH" in "INFO TECH PROF" using context-based standardization operations to "TECHNOLOGY," such that the first raw job title "INFO TECH PROF" is correctly standardized into "INFORMATION TECHNOLOGY PROFESSIONAL." The transformation module 108 can correctly map "TECH" in 'TECH SUPPORT' to "TECHNICAL," such that the second raw job title "INFO TECH PROF" is correctly standardized into "TECHNICAL SUPPORT."

The context-based standardization operations described herein can provide advantages over existing standardization operations. For example, without the context-based standardization operations performed by the transformation module 108, the term "TECH" may not be transformed into a more specific standardized term. Thus, the two initial descriptors discussed in the example above would be standardized as "INFORMATION TECH PROFESSIONAL" and "TECH SUPPORT," with no attempt to standardize the "TECH" term. Alternatively, without the context-based standardization operations performed by the transformation module 108, an incorrect mapping may occur (e.g., "INFORMATION TECHNICAL PROFESSIONAL" being mapped to " " or "TECH SUPPORT" being mapped to "TECHNOLOGY SUPPORT." By contrast, the context-based standardization operations performed by the transformation module 108 can use the context of "INFO TECH PROF" and "TECH SUPPORT" (e.g., the words that appear before "TECH." the words that appear after "TECH," or both) to correctly map "TECH" in a manner that is appropriate for the context.

For instance, in above example, the transformation module 108 can determine that the word "technology" is followed by "professional" more frequently in stored textual data as compared to "technical" or "technician." Similarly, the transformation module 108 can determine that the word "support" is preceded by "technical" more often than it is by "technology" or "technician." The frequency of these contexts can be used to build a suitable lookup table or other mapping data for transforming descriptors into standardized descriptors.

Figure 5:
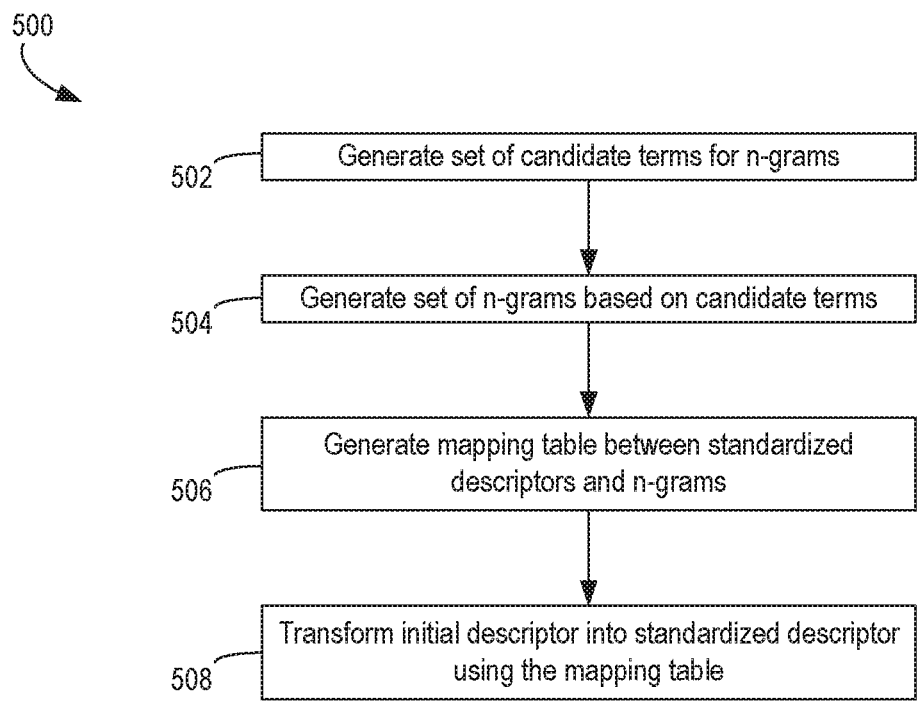
FIG. 5 depicts an example of a process for performing context-based standardization of a text descriptor, according to some aspects of the present disclosure.

FIG. 5 is a flow chart depicting an example of a process 500 for performing context-based standardization of a text descriptor. In some aspects, the process 500 can be used to implement one or more operations of the process 300 (e.g., block 304 for standardizing tokens, block 308 for replacing abbreviations, etc.). In other aspects, the process 500 can be performed independently of, or in addition to, the process 300. For illustrative purposes, the process 500 is described with reference to one or more of the implementations depicted in FIGS. 1-15 and various other examples described herein. But other implementations are possible. Although English-language examples are used herein, process 500 can be applied to textual data in any human-readable language that involves abbreviations or other methods for shortening words or phrases.

In block 502, the process 500 involves generating a set of candidate terms for n-grams. One or more processing devices can execute the transformation module 108 to implement block 502. In some aspects, the transformation module 108 can build a list (or other set) of non-English words from the raw textual data 112 (e.g., all words from all job titles) that can be mapped to a proper English word (e.g., those that appear in a standard English dictionary or other table included in the valid-words tables 204). This set of non-English words can be the set of candidate terms for n-grams.

An example of a set of candidate terms is depicted in Table 11.

TABLE 11

| Candidate Terms |
| --- |
| DIR |
| TECH |
| SPEC |
| COORD |
| ASSOC |
| REP |
| ADMIN |
| DEV |
| ENG |
| EXEC |
| CORP |
| PROD |

An n-gram can be a string of n words (or other terms), where each pair of words or terms is separated by one or more spaces. For example, "Sr Director" is a bi-gram (or 2-gram) having a space between the terms "Sr" and "Director," and "Principal Data Sci" is a tri-gram (or 3-gram) having a space between "Principal" and "Data" as well as a space between "Data" and "Sci." The process 500 can be applied to n-grams with an value of n (e.g., n∈{6,5,4,3,2}). In some aspects, higher-order n-grams (e.g., n>6) may appear rarely, and building mapping data for these higher-order n-grams may provide little incremental value.

In block 504, the process 500 involves generating a set of n-grams based on the candidate terms. One or more processing devices can execute the transformation module 108 to implement block 504. The transformation module 108 can create n-grams (for n>2) from some or all available job titles (or descriptors) such that each n-gram includes at least one non-English word or other term. For example, "Principal Data Scientist" can be transformed into one tri-gram ("PRINCIPAL DATA SCI") and one bi-gram ("DATA SCI") by replacing "Scientist" with the term "SCI" from the set of candidate terms. Certain n-grams (e.g., "PRINCIPAL DATA") that do not contain at least one non-English word can be ignored. An example of a set of n-grams generated at block 504 is depicted in Table 12.

TABLE 12

| N-gram set |
| --- |
| ASSOC DIR |
| EXEC DIR |
| SALES REP |
| CUSTOMER SERVICE REP |
| CUST SVC REP |
| LEAD MERCH ACCES STORE |
| STORE MAYNT ASSOC STORE |
| SERVICE EXP RAPID RESP AGENT |
| PROD DEVELOP ENGR TEAM LEAD |

Returning to FIG. 5, in block 506, the process 500 involves generating a mapping table between standardized descriptors and the n-grams. One or more processing devices can execute the transformation module 108 to implement block 506. For example, the transformation module 108 can use, for each entry in the set of n-grams generated in block 504, regular expressions to find possible mappings and associated frequencies. Each mapping is generated such that at least one non-English word contained in the set of n-grams can have a mapping to an English word.

The result of this operation is the mapping table. An example of a mapping table is depicted in Table 13, in which n-grams are mapped to standardized identifiers (i.e., descriptors).

TABLE 13

| N-Gram | Standardized Identifier |
| --- | --- |
| ASSOC DIR | ASSOCIATE DIRECTOR |
| EXEC DIR | EXECUTIVE DIRECTOR |
| SALES REP | SALES REPRESENTATIVE |
| CUSTOMER SERVICE REP | CUSTOMER SERVICE REPRESENTATIVE |
| CUST SVC REP | CUSTOMER SVC REPRESENTATIVE |
| ADJ CLIN ASST PROF | ADJUNCT CLINICAL ASST PROFESSOR |
| PROD DEVELOP ENGR TEAM LEAD | PRODUCT DEVELOPMENT ENGR TEAM LEAD |

Returning to FIG. 5, in block 508, the process 500 involves transforming one or more initial descriptors into one or more standardized descriptors using the mapping table. One or more processing devices can execute the transformation module 108 to implement block 508. For example, the transformation module 108 can encounter one or more partially standardized titles or other descriptors. The transformation module 108 can iteratively scan a particular title or other descriptor to determine whether the title or other descriptor includes one or more entries corresponding to an n-gram portion of the mapping table generated at block 506 and mapped to the corresponding standardized descriptor portion of the mapping table. In some aspects, higher order n-grams entries can be checked before lower order n-grams for possible mappings until no further mapping can be applied.

An example of the results of this standardization operation is depicted in Table 14.

TABLE 14

| Initial Identifier (Raw Textual Data) | Standardized Identifier (Transformed Textual Data) |
| --- | --- |
| Assoc Dir-Sys Engrg | ASSOCIATE DIRECTOR SYSTEMS ENGINEERING |
| Sr. Customer Service Rep. | SENIOR CUSTOMER SERVICE REPRESENTATIVE |
| Prod Develop Engr Team Lead | PRODUCT DEVELOPMENT ENGINEER |
| PowerTrain & Vehicle NVH Analysis | TEAM LEAD POWERTRAIN AND VEHICLE NVH ANALYSIS |

In this example, initial identifiers (e.g., raw titles or other descriptors) and their corresponding standardized identifiers (i.e., descriptors) are depicted.

In this example, the process 500 includes generating patterns performing one or more operation from blocks 502, 504, and 506. The process 500 also includes using the generated patterns in block 508 to standardize titles or other descriptors. In some aspects, the transformation module 108 can perform the pattern-generation operations once and can store the generated patterns. The transformation module 108 can use the stored patterns to standardize titles or other descriptors during a standardization process.

Example of a Computing Environment for Transforming Entity Descriptors

Figure 6:
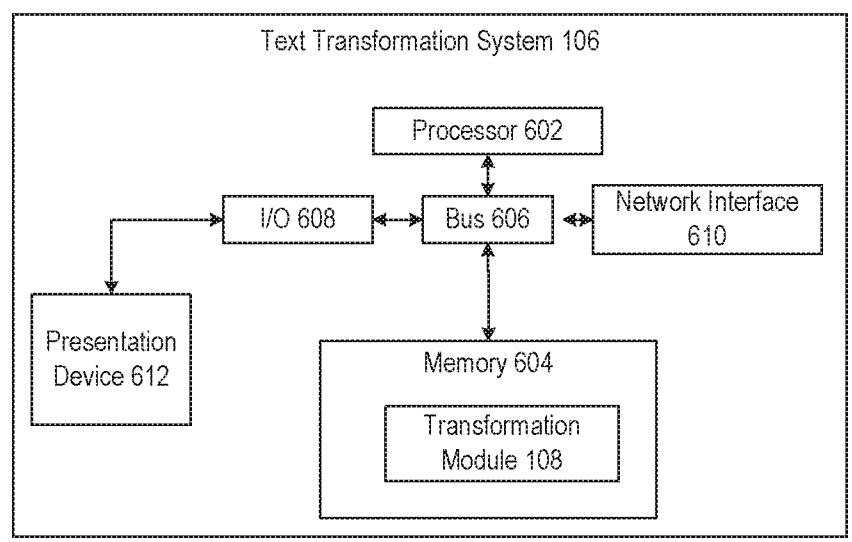
FIG. 6 depicts an example of a text transformation system usable for implementing certain aspects of the present disclosure.

Any suitable computing device or group of devices can be used to perform the operations described herein. For example, FIG. 6 is a block diagram depicting an example of a text transformation system 106. The depicted text transformation system 106 can include various devices for communicating with other devices in the computing system 100, as described with respect to FIG. 1. The text transformation system 106 can include various devices for performing one or more transformation operations described above with respect to FIGS. 1-5.

The text transformation system 106 can include a processor 602 that is communicatively coupled to a memory 604. The processor 602 executes computer-executable program code stored in the memory 604, accesses information stored in the memory 604, or both. Program code may include machine-executable instructions that represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices. The processor 602 can include or communicate with a memory 604. The memory 604 stores program code that, when executed by the processor 602, causes the processor to perform operations described herein.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C #, Visual Basic, Java, Python, Perl, JavaScript, ActionScript, etc.

The text transformation system 106 may also include a number of external or internal devices such as input or output devices. For example, the text transformation system 106 includes an input/output interface 608 that can receive input from input devices or provide output to output devices. A bus 606 can be included in the text transformation system 106. The bus 606 can communicatively couple one or more components of the text transformation system 106.

The text transformation system 106 can execute program code that includes the transformation module 108. The program code for the transformation module 108 may reside in any suitable computer-readable medium and may be executed on any suitable processing device. For example, as depicted in FIG. 6, the program code for the transformation module 108 can reside in the memory 604 at the text transformation system 106. Executing the transformation module 108 can configure the processor 602 to perform operations described herein.

In some aspects, the text transformation system 106 can include one or more output devices. One example of an output device is the network interface device 610 depicted in FIG. 6. A network interface device 610 can include any device or group of devices suitable for establishing a wired or wireless data connection to one or more data networks 104. Non-limiting examples of the network interface device 610 include an Ethernet network adapter, a modem, etc. Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method comprising:
generating a transformed dataset by performing, with one or more computing devices, operations comprising:
accessing, from a data structure on a non-transitory computer-readable medium, raw textual data from records describing entities and comprising multiple entity descriptors for the entities, wherein the entity descriptors include a set of different entity descriptors for a common entity type;
configuring an order of conversion operations that transform the records in the data structure into the transformed dataset, wherein configuring the order of conversion operations comprises:
computing a first standardization metric for a first version of an entity descriptor outputted by a first conversion operation and a second standardization metric for a second version of the entity descriptor outputted by a second conversion operation, wherein a standardization metric comprises one or more of:
a confidence metric indicating a percentage of tokens from a version of the entity descriptor that match standardized tokens in lookup tables used to convert the set of different entity descriptors into a standardized entity descriptor, and
a reduction metric indicating a decrease in a number of unique descriptors as a result of a conversion operation;
identifying a change in value from the second standardization metric to the first standardization metric that indicates a decreased performance of the conversion operations; and
modifying, based on the second standardization metric being less than the first standardization metric, the order of the conversion operations;
performing the conversion operations in the configured order to convert the set of different entity descriptors into the standardized entity descriptor for the common entity type, the conversion operations comprising, for each entity descriptor in the set of different entity descriptors:
converting raw data of the entity descriptor into a common format for processing,
standardizing tokens in the entity descriptor that has been converted into the common format,
standardizing the entity descriptor with respect to one or more special characters included in one or more of the standardized tokens, wherein the special characters comprising punctuation marks,
replacing abbreviations in the entity descriptor,
separating joined words included in the entity descriptor,
standardizing an authority level indicated by the entity descriptor, and
removing site-based tokens from the entity descriptor;
receiving, by a processing device and from a client device, a request to perform an analytical operation, wherein performing the analytical operation involves a query regarding the common entity type;
extracting, by the processing device, a query parameter having a particular standardized entity descriptor for the common entity type;
parsing, by the processing device, the transformed dataset that is indexed in accordance with standardized entity descriptors;
matching, by the processing device, a particular standardized entity descriptor extracted from the query with a subset of the transformed dataset having index values with the particular standardized entity descriptor; and
retrieving, in response to the query, the subset of the transformed dataset having the index values with the particular standardized entity descriptor.

2. The method of claim 1, further comprising:
generating, by the processing device, a set of candidate terms using textual data stored in a non-transitory computer-readable medium, wherein each candidate term is a shortened version of a word in a standard descriptor; and
generating, by the processing device and based on the set of candidate terms, a mapping table comprising a set of n-grams, wherein the mapping table is usable for transforming initial descriptors having multiple tokens into standardized descriptors, wherein a first n-gram in the set of n-grams includes a first word corresponding to a given candidate term from the set of candidate terms, wherein a second n-gram in the set of n-grams includes a second word that (i) is different from the first word and (ii) corresponds to the given candidate term;
wherein standardizing tokens in the converted descriptor comprises:
matching, via the mapping table, a set of tokens in the converted descriptor to one of the first n-gram or the second n-gram, and
transforming, using the matching, the set of tokens into a set of standardized tokens that corresponding to the one of the first n-gram or the second n-gram.

3. The method of claim 1, further comprising:
computing a current confidence metric for a current version of a descriptor outputted by one or more of the conversion operations, wherein the current confidence metric indicates a percentage of tokens from the current version that match standardized tokens in lookup tables used to convert the set of different entity descriptors into the standardized entity descriptor;
determining that the current confidence metric is less than a threshold confidence metric; and
transmitting, based on the current confidence metric being less than the threshold confidence metric, a notification to a source of the entity descriptor indicating that a descriptor schema used by the source lacks standardized terms.

4. The method of claim 1, wherein converting raw data of the entity descriptor into the common format for processing comprises one or more of:
removing at least some white space from the raw data;
converting lower-case character in the entity descriptor to corresponding upper-case characters;
matching at least one token in the entity descriptor to an invalid token table and removing the at least one token based on the matching; and
removing non-alphabetical characters from a beginning of the entity descriptor.

5. The method of claim 1, wherein standardizing the entity descriptor with respect to the special characters comprises one or more of:
   standardizing a token that includes an ampersand by converting the ampersand to a corresponding word or phrase; and
   standardizing a token that includes a forward slash, a dash, or a dot by replacing the forward slash, the dash, or the dot with a space.

6. The method of claim 1, wherein replacing the abbreviations in the entity descriptor comprises, for each record having an abbreviation in the entity descriptor:
   accessing, from a non-transitory computer-readable medium, a lookup table that maps the abbreviation to a long form of the abbreviation;
   retrieving, from the lookup table, the long form; and
   modifying the record by removing the abbreviation and inserting the long form retrieved from the lookup table.

7. The method of claim 1, wherein separating the joined words included in the entity descriptor comprises:
   accessing, from a non-transitory computer-readable medium, a lookup table having a set of joined words;
   determining, from the lookup table, that a string in a record matches a joined word from the set of joined words;
   retrieving, from the lookup table, a set of two or more words that is mapped to the joined word; and
   modifying the record by removing the joined word and inserting the set of two or more words retrieved from the lookup table.

8. The method of claim 1, wherein removing site-based tokens from the entity descriptor comprises:
   determining, for a record, that the record includes a token identifying a geographic location;
   matching the token identifying a geographic location to a site-based token from a lookup table stored in a non-transitory computer-readable medium; and
   modifying the record by deleting the token identifying a geographic location.

9. The method of claim 1, further comprising performing, subsequent to converting the set of different entity descriptors into a standardized entity descriptor for the common entity type, one or more of:
   removing one or more noun tokens from one or more entity descriptors in the set of different entity descriptors, wherein each noun token is identified by referencing a noun lookup table;
   reordering tokens in the standardized entity descriptor in accordance with a bag-of-words model or an alphabet;
   removing punctuation from the standardized entity descriptor; or
   verifying that the standardized entity descriptor is absent from an invalid title table.

10. The method of claim 1, wherein the configured order of the conversion operations comprises:
   performing the replacing abbreviations in the entity descriptor subsequent to standardizing the entity descriptor with respect to special characters;
   performing the separating joined words included in the entity descriptor subsequent to replacing the abbreviations in the entity descriptor;
   performing the standardizing an authority level indicated by the entity descriptor subsequent to separating the joined words in the entity descriptor; and
   performing the removing site-based tokens from the entity descriptor subsequent to standardizing the authority level.

11. A system comprising:
   a network interface device configured for receiving, from a client device, a request to perform an analytical operation, wherein performing the analytical operation involves a query regarding a common entity type;
   one or more processing devices communicatively coupled to the network interface device; and
   a memory device in which instructions executable by the one or more processing devices are stored for causing the one or more processing devices to:
      extract a query parameter having a particular standardized entity descriptor for the common entity type;
      parse a transformed dataset that is indexed in accordance with standardized entity descriptors;
      match the particular standardized entity descriptor extracted from the query with a subset of the transformed dataset having index values with the particular standardized entity descriptor; and
      retrieve the subset of the transformed dataset having the index values with the particular standardized entity descriptor,
   wherein the one or more processing devices are configured to generate the transformed dataset by performing operations comprising:
      accessing, from a data structure on a non-transitory computer-readable medium, raw textual data from records describing entities and comprising multiple entity descriptors for the entities, wherein the entity descriptors include a set of different entity descriptors for the common entity type;
      configuring an order of conversion operations that transform the records in the data structure into the transformed dataset, wherein configuring the order of conversion operations comprises:
         computing a first standardization metric for a first version of an entity descriptor outputted by a first conversion operation and a second standardization metric for a second version of the entity descriptor outputted by a second conversion operation, wherein a standardization metric comprises one or more of:
            a confidence metric indicating a percentage of tokens from a version of the entity descriptor that match standardized tokens in lookup tables used to convert the set of different entity descriptors into a standardized entity descriptor, and
            a reduction metric indicating a decrease in a number of unique descriptors as a result of a conversion operation,
         identifying a change in value from the second standardization metric to the first standardization metric that indicates a decreased performance of the conversion operations, and
         modifying, based on the second standardization metric being less than the first standardization metric, the order of the conversion operations; and
      performing the conversion operations in the configured order to convert the set of different entity descriptors into the standardized entity descriptor for the common entity type, the conversion operations comprising, for each entity descriptor in the set of different entity descriptors:
         converting raw data of the entity descriptor into a common format for processing,
         standardizing tokens in the entity descriptor that has been converted into the common format, standardizing the entity descriptor with respect to one or more special characters included in one or more of the standardized tokens, wherein the special characters comprising punctuation marks, replacing abbreviations in the entity descriptor, separating joined words included in the entity descriptor, standardizing an authority level indicated by the entity descriptor, and removing site-based tokens from the entity descriptor.

12. The system of claim 11, wherein the one or more processing devices are further configured to perform additional operations comprising:

generating a set of candidate terms using textual data stored in a memory device, wherein each candidate term is a shortened version of a word in a standard descriptor; and generating, based on the set of candidate terms, a mapping table comprising a set of n-grams, wherein the mapping table is usable for transforming initial descriptors having multiple tokens into standardized descriptors, wherein a first n-gram in the set of n-grams includes a first word corresponding to a given candidate term from the set of candidate terms, wherein a second n-gram in the set of n-grams includes a second word that (i) is different from the first word and (ii) corresponds to the given candidate term;

wherein standardizing tokens in the converted descriptor comprises:

matching, via the mapping table, a set of tokens in the converted descriptor to one of the first n-gram or the second n-gram, and transforming, using the matching, the set of tokens into a set of standardized tokens that corresponding to the one of the first n-gram or the second n-gram.

13. The system of claim 11, wherein the one or more processing devices are further configured to perform additional operations comprising:

computing a current confidence metric for a current version of a descriptor outputted by one or more of the conversion operations, wherein the current confidence metric indicates a percentage of tokens from the current version that match standardized tokens in lookup tables used to convert the set of different entity descriptors into the standardized entity descriptor;

determining that the current confidence metric is less than a threshold confidence metric; and transmitting, based on the current confidence metric being less than threshold confidence metric, a notification to a source of the entity descriptor indicating that a descriptor schema used by the source lacks standardized terms.

14. The system of claim 11, wherein converting raw data of the entity descriptor into the common format for processing comprises one or more of:

removing at least some white space from the raw data;

converting lower-case character in the entity descriptor to corresponding upper-case characters;

matching at least one token in the entity descriptor to an invalid token table and removing the at least one token based on the matching; and removing non-alphabetical characters from a beginning of the entity descriptor.

15. The system of claim 11, wherein the configured order of the conversion operations comprises:

performing the replacing abbreviations in the entity descriptor subsequent to standardizing the entity descriptor with respect to special characters;

performing the separating joined words included in the entity descriptor subsequent to replacing the abbreviations;

performing the standardizing an authority level indicated by the entity descriptor subsequent to separating the joined words; and performing the removing site-based tokens from the entity descriptor subsequent to standardizing the authority level.

16. A non-transitory computer-readable storage medium having program code that is executable by one or more processing devices to cause the one or more processing devices to:

extract, from a query regarding a common entity type, a query parameter having a particular standardized entity descriptor for the common entity type;

parse a transformed dataset that is indexed in accordance with standardized entity descriptors;

match the particular standardized entity descriptor extracted from the query with a subset of the transformed dataset having index values with the particular standardized entity descriptor; and retrieve the subset of the transformed dataset having the index values with the particular standardized entity descriptor, wherein the executing the program code further causes the one or more processing to generate the transformed dataset by performing operations comprising:

accessing, from a data structure on a non-transitory computer-readable medium, raw textual data from records describing entities and comprising multiple entity descriptors for the entities, wherein the entity descriptors include a set of different entity descriptors for the common entity type;

configuring an order of conversion operations that transform the records in the data structure into the transformed dataset, wherein configuring the order of conversion operations comprises:

computing a first standardization metric for a first version of an entity descriptor outputted by a first conversion operation and a second standardization metric for a second version of the entity descriptor outputted by a second conversion operation, wherein a standardization metric comprises one or more of:

a confidence metric indicating a percentage of tokens from a version of the entity descriptor that match standardized tokens in lookup tables used to convert the set of different entity descriptors into a standardized entity descriptor, and a reduction metric indicating a decrease in a number of unique descriptors as a result of a conversion operation;

identifying a change in value from the second standardization metric to the first standardization metric that indicates a decreased performance of the conversion operations; and modifying, based on the second standardization metric being less than the first standardization metric, the order of the conversion operations; and performing the conversion operations in the configured order to convert the set of different entity descriptors into the standardized entity descriptor for the common entity type, the conversion operations comprising, for each entity descriptor in the set of different entity descriptors:
converting raw data of the entity descriptor into a common format for processing,
standardizing tokens in the entity descriptor that has been converted into the common format,
standardizing the entity descriptor with respect to one or more special characters included in one or more of the standardized tokens, wherein the special characters comprising punctuation marks,
replacing abbreviations in the entity descriptor,
separating joined words included in the entity descriptor,
standardizing an authority level indicated by the entity descriptor, and
removing site-based tokens from the entity descriptor.

17. The non-transitory computer-readable storage medium of claim 16, wherein the executing the program code further causes the one or more processing to perform additional operations comprising:
generating a set of candidate terms using textual data stored in a memory device, wherein each candidate term is a shortened version of a word in a standard descriptor; and
generating, based on the set of candidate terms, a mapping table comprising a set of n-grams, wherein the mapping table is usable for transforming initial descriptors having multiple tokens into standardized descriptors, wherein a first n-gram in the set of n-grams includes a first word corresponding to a given candidate term from the set of candidate terms, wherein a second n-gram in the set of n-grams includes a second word that (i) is different from the first word and (ii) corresponds to the given candidate term;
wherein standardizing tokens in the converted descriptor comprises:
matching, via the mapping table, a set of tokens in the converted descriptor to one of the first n-gram or the second n-gram, and
transforming, using the matching, the set of tokens into a set of standardized tokens that corresponding to the one of the first n-gram or the second n-gram.

18. The non-transitory computer-readable storage medium of claim 16, wherein the executing the program code further causes the one or more processing to perform additional operations comprising:
computing a current confidence metric for a current version of a descriptor outputted by one or more of the conversion operations, wherein the current confidence metric indicates a percentage of tokens from the current version that match standardized tokens in lookup tables used to convert the set of different entity descriptors into the standardized entity descriptor;
determining that the current confidence metric is less than a threshold confidence metric; and
transmitting, based on the current confidence metric being less than the threshold confidence metric, a notification to a source of the entity descriptor indicating that a descriptor schema used by the source lacks standardized terms.

19. The non-transitory computer-readable storage medium of claim 16, wherein converting raw data of the entity descriptor into the common format for processing comprises one or more of:
removing at least some white space from the raw data;
converting lower-case character in the entity descriptor to corresponding upper-case characters;
matching at least one token in the entity descriptor to an invalid token table and removing the at least one token based on the matching; and
removing non-alphabetical characters from a beginning of the entity descriptor.

20. The non-transitory computer-readable storage medium of claim 16, wherein the configured order of the conversion operations comprises:
performing the replacing abbreviations in the entity descriptor subsequent to standardizing the entity descriptor with respect to special characters;
performing the separating joined words included in the entity descriptor subsequent to replacing the abbreviations;
performing the standardizing an authority level indicated by the entity descriptor subsequent to separating the joined words; and
performing the removing site-based tokens from the entity descriptor subsequent to standardizing the authority level.

* * * * *